Patented Aug. 15, 1944

2,356,065

UNITED STATES PATENT OFFICE 2,356,065

METER INK

Thomas J. Keating, Bloomfield, N. J., assignor to Westinghouse Electric & Manufacturing Company, East Pittsburgh, Pa., a corporation of Pennsylvania No Drawing. Application May 22, 1942, Serial No. 444,112

4 Claims. (Cl. 106—22)

This invention relates to an ink, more particularly an ink suitable for use in recording meters and in blue-printing.

This application is a continuation-in-part of application Serial No. 341,137, entitled "Meter ink," filed June 18, 1940.

The object of this invention is to provide for a red ink, particularly for use in recorders.

Other objects of the invention will appear from the following description and claims.

The service requirements for inks, such as are employed in recorders and other instruments, call for a fast drying and stable marking fluid which will withstand considerable exposure in recorder pen fountains to the atmosphere without clogging or thickening. The service is so exacting, that, in general, fillers of any kind may not be employed in the ink. A supply of ink sufficient to last for one or more days is placed in the pen of the recording instrument and the ink is expected to perform without failure irrespective of the humidity, temperature and other characteristics of the locality within which the recorder is located. The trace made by the pen should be of uniform width, of uniform color and with no uninked portions of a pen trace no matter how rapidly the pen moves or how long the pen stays in a given spot.

According to the invention, a composition for a red ink has been discovered which meets the service requirements to a high degree. The ink comprises a major amount of a red dye and a yellow dye and solvent therefor, the dyes being perfectly soluble in the solvent in an extensive range of proportions.

The red dye which is the fundamental color base of the ink is the sodium salt of benzene-azo-benzene-azo-B-naphthol 6:8-disulphonic acid, corresponding to the following chemical structure:

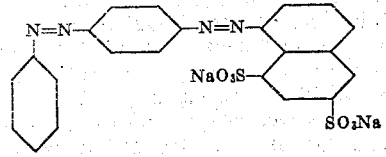

This dye gives an intensely brilliant red and is a stable and permanent red color identified by a Color Index number of 252.

In order to slightly modify the deep red color of the red and impart to it greater luminosity or value, additions of a yellow dye of the tartrazine type is employed. The yellow tartrazine dyes correspond to the following general formula:

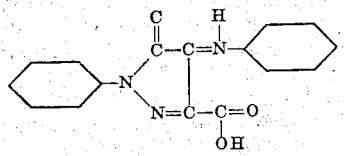

A specific tartrazine dye which has been used with success in making the ink corresponds to the following formula:

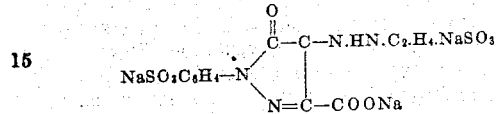

The specific yellow tartrazine employed is the highly concentrated dye having a Color Index number of 640. If the less highly concentrated tartrazine dye normally available to the trade is employed, then it may be necessary to use a greater quantity thereof than indicated hereinafter.

Suitable solvents for the two dyes are a composition of about 13½% glycerine preferably of a chemically pure grade 95% concentrated, about 68% of distilled water, about 18% of ethyl alcohol and about ½% of a preferably chemically pure acetic acid, 28% concentrated. The acetic acid acts as a preservative and increases the solubility of the dyes in the solvents.

The ethyl alcohol in the above formula may be a denatured alcohol containing 5% methyl alcohol.

The solvent liquids are mixed in a suitable container and are warmed to approximately 38° C. and stirred until thoroughly combined and thereafter the dyes may be added. A satisfactory ink composition consists of one gram of the yellow tartrazine dye and 1¼ grams of the red dye dissolved in about 110 milliliters of solvent. The solution is stirred at 38° C. until the dyes have completely dissolved. The solution is allowed to cool to room temperature (20° C.) and is thereafter filtered. The ink is ready for use after filtering.

A convenient method of measuring out the required volume of the liquids used for the solvent is to combine 15 milliliters of 95% glycerine, 75 milliliters of distilled water, 20 milliliters of ethyl alcohol and ½ milliliter of 28% acetic acid. One gram of yellow tartrazine dye and 1¼ grams of red dye dissolved in this quantity of solvent by the above method will result in the desired ink.

Another formulation for a dye composed of the same ingredients as hereinbefore disclosed, but requiring more time for drying, consists of:

| | | |
|---|---|---|
| Red dye | grams | 2 |
| Yellow tartrazine dye | do | ¼ |
| Glycerine | c.c. | 40 |
| Water | do | 75 |
| Alcohol | do | 10 |
| Acetic acid | do | ¼ |

This formulation may be used for all the purposes that the first ink composition may be employed, but does not exhibit as intense blueprinting qualities due to the lesser proportion of yellow dye.

It is preferred for recorder applications to keep the amount of yellow dye less than the amount of red dye employed. The quantity, however, may be varied to suit requirements. Increasing the amount of red with respect to the yellow results in a deeper shade of red being obtained, but this sacrifices some of the blueprinting quality. If the amount of yellow tartrazine dye is much greater than that of the red, the red will appear somewhat pale. An increase of yellow dye enhances the intensity for blueprinting purposes.

For the purpose of this invention, the dyes may be admixed in proportions ranging from 1 to 8 parts by weight of the red dye to each part by weight of the yellow tartrazine dye. The formulations containing the higher proportion of yellow dye to red dye will give the more intense lines upon blueprinting, but all of the proportions within this range will be satisfactory in blueprinting charts prepared therefrom.

In producing inks by dissolving the dyes in solvents, it is desirable to employ solvents prepared by combining a monohydric alcohol, a polyhydric alcohol, water, and a preservative if it be desired. Suitable monohydric alcohols are ethyl alcohol, denatured alcohol, methyl alcohol, and butyl alcohol. Examples of polyhydric alcohols, in addition to glycerine as disclosed hereinbefore, are ethylene glycol, propylene glycol, and diethylene glycol. Phenol is a satisfactory substitute for acetic acid to function as a preservative. The following formulae are examples of suitable solvent and dye combinations:

*I*

| | | |
|---|---|---|
| Yellow tartrazine dye | grams | ½ |
| Red dye—In. No. 252 | do | 1¾ |
| Ethylene glycol | c.c. | 20 |
| Butyl alcohol | do | 20 |
| Water | do | 70 |
| Phenol | do | ½ |

*II*

| | | |
|---|---|---|
| Yellow tartrazine dye | grams | 1 |
| Red dye—In. No. 252 | do | 1¼ |
| Propylene glycol | c.c. | 15 |
| Wood alcohol | do | 20 |
| Water | do | 70 |
| Acetic acid | do | ½ |

In some cases, other organic solvents that are miscible with water, alcohol and polyhydric alcohol may be employed in producing a satisfactory recording ink. The main requirement for the solvents is that they do not form gums when exposed to the atmosphere for periods of time. Furthermore, the solvents should be capable of being volatilized without leaving any gum or residue.

The polyhydric alcohols present in the ink are hydroscopic materials tending to absorb moisture from the atmosphere, thereby preventing the ink in the pen from drying out. However, upon tracing a line on paper, the polyhydric alcohols will be readily absorbed by the paper, leaving a dry trace consisting of the dyes.

The amount of solvent used for a given quantity of dye may be varied. However, if a greater quantity of solvent is used than the amount indicated above for a given weight of the dye, then the ink will trace a thin and pale appearing line and will not have much body. If the indicated amount of solvent is greatly decreased for a given weight of dye, less ink for a given quantity of dye is made and no compensating advantage in color or effectiveness is obtained. In addition, if the proportion of alcohol in the first example is reduced one-half, the ink dries slowly and is not as satisfactory for recorder purposes.

The composition and amounts given above are those best suited for the purposes set forth but departure from such specific quantities can be made within reasonable limits without great variation in the product and such variations are within the scope of the present invention.

I claim as my invention:

1. An ink comprising 1 gram of yellow tartrazine dye of Color Index No. 640, one and one-quarter grams of sodium benzene-azo-benzene-azo-B-naphthol-6:8-disulphonic acid, 15 milliliters of glycerine, 75 milliliters distilled water, 20 milliliters ethyl alcohol and ½ milliliter of 28% acetic acid, the whole being compounded to effect a fast drying and stable red ink.

2. A red ink suitable for recorders and for blueprinting composed of 1 gram of yellow tartrazine dye, 1¼ grams of sodium benzene-azo-benzene - azo - B - naphthol-6:8-disulphonic acid to provide for the red coloring and solvents for the dyes consisting essentially of glycerine, ethyl alcohol and water, the solvents being capable of drying and leaving substantially no residue, the whole being compounded to effect a stable, non-clogging and fast drying ink.

3. A red ink for use in recorders comprising a color base composed of 1¼ to 2 grams of sodium benzene - azo - benzene-azo-B-naphthol-6:8-disulphonic acid and 1 to ¼ gram of yellow tartrazine dye having a Color Index number of 640, the color base being dissolved in over 110 milliliters of a volatile solvent composed of glycerine, ethyl alcohol, water and acetic acid, the whole effecting a fast drying, non-clogging and stable ink.

4. A red ink suitable for use in recorders for preparing charts that may be blueprinted effectively, comprising a color base composed of one part by weight of a yellow tartrazine dye of Color Index No. 640 and about from one to eight parts of sodium benzene-azo-B-naphthol-6:8-disulphonic acid, one part of the color base being dissolved in 20 to 100 parts of a non-gumming, substantially completely volatile solvent composed of a monohydric alcohol having from 1 to 4 carbon atoms, a liquid polyhydric alcohol, a preservative and water.

THOMAS J. KEATING.